(12) United States Patent
Fieremans et al.

(10) Patent No.: US 8,671,206 B2
(45) Date of Patent: Mar. 11, 2014

(54) APPARATUS AND MECHANISM FOR DYNAMIC ASSIGNMENT OF SURVIVABILITY SERVICES TO MOBILE DEVICES

(75) Inventors: Geert Robert Marc Fieremans, Boca Raton, FL (US); Rodrigo Pastro, Lake Worth, FL (US); Johannes Ruetschi, Boca Raton, FL (US)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 0 days.

(21) Appl. No.: 13/699,353

(22) PCT Filed: Feb. 13, 2012

(86) PCT No.: PCT/US2012/024831
§ 371 (c)(1),
(2), (4) Date: Nov. 21, 2012

(87) PCT Pub. No.: WO2012/118610
PCT Pub. Date: Sep. 7, 2012

(65) Prior Publication Data
US 2013/0066960 A1    Mar. 14, 2013

Related U.S. Application Data

(60) Provisional application No. 61/447,338, filed on Feb. 28, 2011.

(51) Int. Cl.
*G06F 15/173* (2006.01)
(52) U.S. Cl.
USPC .......................................................... 709/228

(58) Field of Classification Search
USPC .......................................................... 709/228
See application file for complete search history.

(56) References Cited

U.S. PATENT DOCUMENTS

| 6,829,642 | B1 * | 12/2004 | Giroir et al. ................... 709/225 |
| 2007/0047571 | A1 * | 3/2007 | Kandikonda et al. ......... 370/449 |
| 2008/0141352 | A1 * | 6/2008 | Lindsley et al. .................... 726/6 |
| 2009/0122791 | A1 * | 5/2009 | Ruetschi et al. .............. 370/352 |
| 2010/0070563 | A1 * | 3/2010 | Baker et al. ................... 709/203 |

FOREIGN PATENT DOCUMENTS

| EP | 2197169 A1 | 6/2010 |
| GB | 2463342 A | 3/2010 |

OTHER PUBLICATIONS

International Search Report for PCT/2012/024831 dated May 4, 2012.
Written Opinion for PCT/2012/024831 dated May 4, 2012.

* cited by examiner

*Primary Examiner* — Christopher Biagini
(74) *Attorney, Agent, or Firm* — Buchanan Ingersoll & Rooney

(57) ABSTRACT

A system, a method and a device are each configured for dynamic assignment of survivability services to communication devices (such as, e.g. tablets, smart phones, mobile phones, laptops or other types of mobile communication devices) based on the device's current location and network context. Survivability services provide session and service continuity in case a centralized or cloud based session management service that may be hosted by one or more remote computer devices, such as for example servers, is not reachable due to network failure or service failure.

16 Claims, 3 Drawing Sheets

APPARATUS AND MECHANISM FOR DYNAMIC ASSIGNMENT OF SURVIVABILITY SERVICES TO MOBILE DEVICES

CROSS REFERENCE TO RELATED APPLICATIONS

The present application is the United States national phase under 35 U.S.C. §371 of International Patent Application No. PCT/US2012/024831 that was filed on Feb. 13, 2012 and which claims priority to U.S. Provisional Patent Application No. 61/447,338 filed on Feb. 28, 2011. The entirety of U.S. Provisional Patent Application No. 61/447,338 is incorporated herein by reference.

FIELD OF THE INVENTION

The present invention relates to communication systems and, more particularly, to a communication device and application for such a device that enables an assignment of survivability services to the device upon registration with a service. Examples of communication devices that may have such assignments enabled may include computers, cellular phones, tablets, desktop computers, laptops, personal digital assistants, IP phones, or other terminal devices that utilize one or more processors that run programs stored on memory in communication with or connected to the one or more processors. The communication systems may also include one or more servers or other types of computer devices that may host the service or provide the assignment of survivability services to the devices and one or more servers or other computer device that may provide a survivability service to a communication device.

BACKGROUND OF THE INVENTION

Communication systems may utilize an emergency service for ensuring some devices are able to communicate though a service to which that device is configured to interact experiences a failure. Such an emergency system can permit a device to achieve communications in spite of a central server or other device hosting such a service being inaccessible due to the failure. Typically, such systems require each device to know its location and also know the address of a survivability server or survivability service corresponding to that location. Such systems are typically acceptable for devices having a fixed location as such information may be generally static and not change much over a long period of time.

Such systems, however, are usually not easily useable for mobile devices as it requires users to be aware of a current location and a specific address of a server that provides such survivability services to that location. Since mobile devices often move over a large distance, such information may change often. Most users generally are unable to readily know such information, which could result in the mobile communication device being unable to be used for a desired function when a service outage occurs.

A new system for providing assignment of survivability services to mobile devices is needed. Preferably, such a system may permit a user to easily utilize his or her mobile device when an outage in service occurs by relatively easily obtaining an assignment of a survivability service.

SUMMARY OF THE INVENTION

A communication system is provided that includes a central session management server, a first survivability server, and a first communication device. The first communication device may send an initial message to the central session management server to be authenticated by the central session management server. The initial message includes account information for a user associated with the first communication device and current location information of the first communication device. The central session management server authenticates the first communication device by evaluating the account information and assigning the first survivability server to the first communication device based on the current location information provided in the initial message. The central session management server sends a response message to the first communication device in response to the initial message. The response message includes information to effect an assignment of the first survivability server to the first communication device. The first communication device sends at least one registration message to at least one of the central session management server and the first survivability server to register with the at least one of the central session management server and the first survivability server such that communications utilizing a service hosted by the central session management service is usable by the first communication device via the first survivability server if the central session management server is unable to provide the service.

An example of how the central session management server may be unable to provide the service is a network failure or a failure of the central session management server that prevents the central session management server from communicating with the first communication device to provide the service. Another example of how the central session management server may be unable to provide the service is a wide area network failure.

In some embodiments of the system, the at least one registration message may be just one registration message sent to the central session management server. In other embodiments of the system, the at least one registration message may be just one registration message sent to the first survivability server. The first survivability server may thereafter forward the received registration message to the central session management server. In yet other embodiments of the system, the at least one registration message may include a first registration message sent to the central session management server and a second registration message sent to the first survivability server.

Embodiments of the system may also include additional survivability servers. For instance, the first survivability server may be responsible for providing survivability service in a first area and a second survivability server may be responsible for providing survivability service in a second area and is no longer in the first area. The first area may include a location identified by the current location information of the initial message. The first communication device may be reassigned to the second survivability server by the central session management server after the first communication device is moved such that the first communication device is positioned in a location within the second area. The first communication device may be reassigned by the first communication device sending a message to the central session management server to initiate reassignment. Such a message may include new current location information that identifies the new location of the first communication device. The central session management server may evaluate the new current location information and assign the second survivability sever to the first communication device and send a reassignment message to the first communication device identifying the second survivability server to effectuate the reassignment. Alternatively, the central session management server may send a message to the first communication device to prompt that device to reregister with the central session management server to be reassigned upon detecting or determining that the first communication device is no longer in the first area. Such a re-registration message may be a reassignment message.

In some embodiments, the first communication device may be a mobile device such as a laptop, mobile phone, or tablet. The first communication device may determine when it has moved into the second area. For instance, the first communication device may determine it has moved into the second area by determining it has moved a predetermined distance away from the location identified in the current location information of the initial message. In other embodiments, the first communication device may periodically send a message to the central session management service to identify its location so that the central session management service may determine when the first communication device is no longer in an area covered by the survivability server to which that device is assigned and, thereafter, reassign a survivability server to that device.

The at least one registration message may be a registration message sent to the first survivability server. The first survivability server may then send a message to the central session management server after receiving the registration message from the first communication device to inform the central session management server of the first communication device registering with the first survivability server. The registration message may be an SIP REGISTER message in some embodiments.

The first communication device may be a mobile phone, a laptop, a tablet, or a mobile communication terminal. The current location information may be an IP address, a MAC address, an NW address, a civic address, a Location Identification Number, or an address of the first communication device. Alternatively, the current location information may be coordinate information identifying a geographic location of the first communication device.

The central session management server may utilize call admission control policies to evaluate account information and assign the first communication device to the first survivability server based on the current location information provided in the initial message. The first survivability server in some embodiments may be an SIP proxy.

A method for assigning a survivability service to a communication device is also provided. The method includes the steps of a first communication device sending an initial message to a central session management server to be authenticated by the central session management server. The initial message may include account information for a user associated with the first communication device and current location information of the first communication device. The central session management server authenticates the first communication device may evaluating the account information and assigning a first survivability server to the first communication device based on the current location information provided in the initial message. The central session management server sends a response message to the first communication device in response to the initial message. The response message includes information to effect an assignment of the first survivability server to the first communication device. The first communication device then sends at least one registration message to at least one of the central session management server and the first survivability server. The at least one registration message is sent to register with the first survivability server, the central session management server, or both the first survivability server and the central session management server. The registration message is sent so that communications utilize the service hosted by the central session management server may be usable via the first survivability server even if the central session management server is unable to provide the service.

A terminal communication device is also provided. Examples of such a terminal communication device include a mobile phone, a telephone, a laptop, a mobile computer, a desktop computer, an IP phone, a tablet and a mobile terminal communication device. The terminal communication device includes non-transitory memory and at least one processor communicatively coupled to the memory. The memory has a client application stored thereon that is executed by the at least one processor so that a method is performed by the communication device. The method includes the step of the communication device sending an initial message to a central session management server to be authenticated by the central session management server. The initial message comprises account information for a user associated with the communication device and current location information of the communication device. The method also includes the step of the communication device receiving a response message from the central session management server that is in response to the initial message. The response message comprises information to effect an assignment of a first survivability server to the communication device. The method also includes the step of the communication device sending at least one registration message to at least one of the central session management server and the first survivability server to register with the at least one of the central session management server and the first survivability server such that communications utilizing a service hosted by the central session management service is usable by the communication device via the first survivability server if the central session management server is unable to provide the service.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for assigning mobile communication devices to a survivability service are shown in the accompanying drawings and certain present preferred methods of practicing the same are also illustrated therein. It should be understood that like reference numbers used in the drawings may identify like components.

DETAILED DESCRIPTION OF PRESENT PREFERRED EMBODIMENTS

Figure 1:
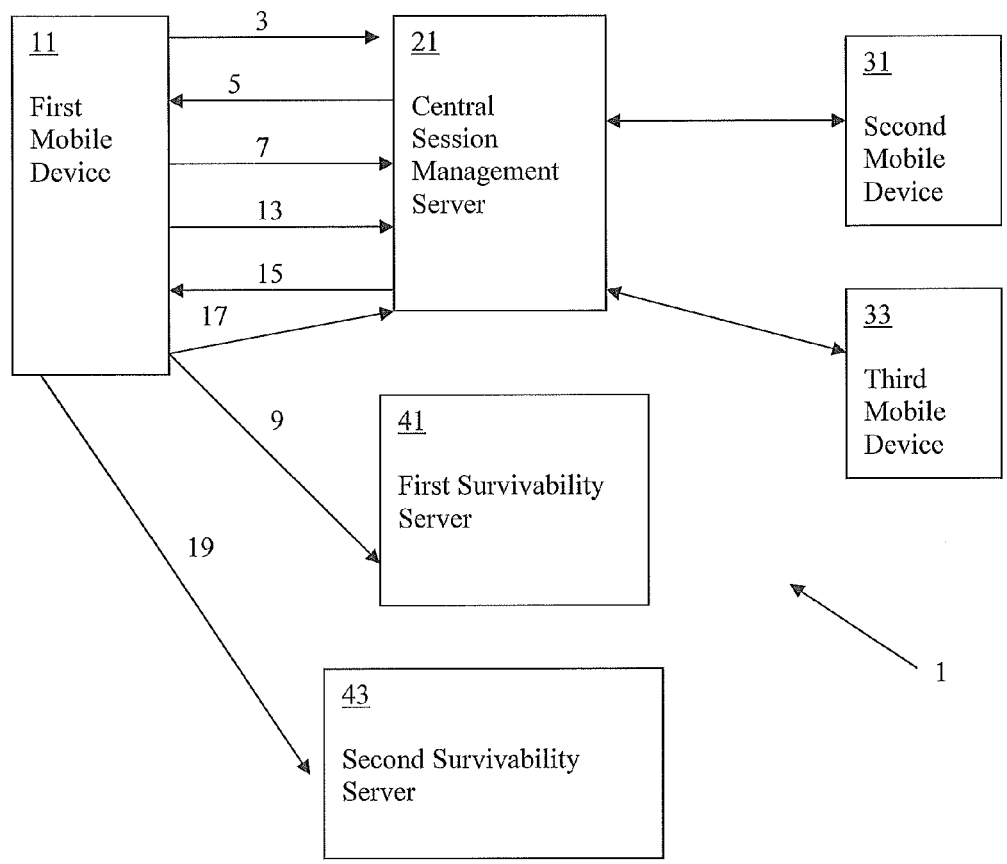
FIG. 1 is a block diagram of a first exemplary embodiment of a communication system.
Figure 2:
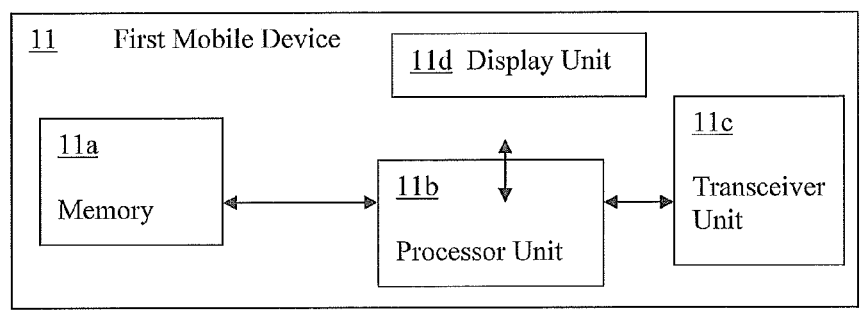
FIG. 2 is a block diagram of an exemplary embodiment of a mobile device that may be utilized in the system.

Referring to FIGS. 1 and 2, a communication system 1 may include a first mobile device 11 and a central session management server 21 that is configured to host a service, such as a communication service. The central session management server 21 may be at least one physical server or other computing device. For instance, the server may be a virtual server hosted by at least one computer device such as a computer, workstation or other computer device. As another example, the central session management server 21 may be a computer device connected to a network for hosting a service provided to a number of other devices within the network.

The system 1 may also include other devices, such as a second mobile device 31 and a third mobile device 33. The first, second and third mobile devices 11, 31, and 33 may be any of a number of different types of mobile communication devices, such as laptop computers, cellular phones, smart phones, tablets, IP phones, or other types of mobile terminal communication devices.

The central session management server 21 may communicate with any of the mobile devices via a network connection or that may be wired or wireless. For instance, the central session management server 21 may communicate with a mobile device via a connection path that includes one or more base stations or nodes within the communication path between the server and the mobile device.

The communication system 1 may also include one or more survivability services that may be provided by one or more servers or other types of computer devices that may communicate with mobile devices registered therewith if the central session management service becomes unavailable or experiences a service failure. For instance, a first survivability server 41 and a second survivability server 42 may be provided in such a system 1. Of course, multiple other survivability servers may also be positioned in the system. Each survivability server may communicate with any of the mobile devices via a network connection, wireless connection, or a direct wireless connection. For instance, a survivability server may communicate with a mobile device via a connection path that includes one or more base stations or nodes within the communication path defined between the survivability server and mobile device.

Each survivability server may be responsible for providing service within a predefined region or area in which service is typically rendered by the central session management server. For example, in the event the central session management server experiences a failure and is unable to provide the communication service to mobile devices in a location within a particular area, the survivability server responsible for that area may provide the service to those mobile devices. For instance, the failure could be due to a network or wide area network failure and, as a result of this failure, the continued service could only be provided by a local survivability server.

The first mobile device 11 may include a processor unit 11*b*, which may be a central processor, a microprocessor, or other processing element that is able to execute software stored on memory 11*a*. The memory 11*a* may be non-transitory memory or a non-transitory computer readable medium, for example. The first mobile device 11 may also include a transceiver unit 11*c* that is communicatable with the processor unit 11*b* and may also be communicatable with the memory 11*a*. The transceiver unit may include a wireless radio capable of receiving wireless signals and also sending wireless signals to communicate with other devices. The transceiver could, for example, include a receiver unit and a transmission unit that is configured to communicate with other devices via a wireless interface. The transceiver unit could also be configured for communication via a wired connection. The first mobile device 11 may also include a display unit 11*d*, such as a touch screen, a liquid crystal display unit, or other display mechanism.

It should be appreciated that the second and third mobile devices 31 and 33 may include similar elements as the first mobile device. For instance, each of these mobile devices may also include memory, one or more processor units and a transceiver unit. Each server that hosts a service may also include memory, one or more processors and a transceiver unit.

The first mobile device 11 may be a communication device that has a client stored thereon that may be run to initiate use of a communication service. The client may be, for example, software stored on the memory 11*a* of the mobile device that is executed by the processor unit 11*b*.

The first mobile device 11 may authenticate itself with the central session management server that hosts a communication service in an initial communication 3 with the central session management server. The initial communication 3 may be an authentication communication that includes account information from a user associated with the first mobile device. The account information may include a user name, password, and other information defined by user input or provisioning service that was provided to the first mobile device 11 and stored in the memory 11*a* of the first mobile device.

The initial communication 3 may also include current location information that identifies a current location of the first mobile device 11. The current location information provided in the initial communication 3 may include, for example, an IP address of the first mobile device, a Media Access Control ("MAC") address of the first mobile communication device, a nanowire ("NW") address of the first communication mobile device, a civic address of the first mobile communication device, a Location Identification Number of the first mobile communication device, a location domain obtained via a Dynamic Host Configuration Protocol ("DHCP"), a current location determined via a location finding mechanism such as a global positioning system ("GPS") or other location identifying mechanism. In some embodiments, the client may be configured so that the first mobile communication device transmits all the information provided in the initial communication 3 by a user pressing one button or via actuation of a single icon shown on a touch screen display of the first mobile device. Alternatively, the client may be configured so that the first mobile communication device automatically initiates the initial communication once the account information of the user is available.

The central session management server 21 may receive the initial communication 3 from the first mobile device 11 and use Call Admission Control ("CAC") policies to determine the survivability server corresponding to the first mobile device's current location identified within the initial communication 3. Upon authentication of at least the sign-in information of the user account information in the initial communication 3, the central session management server 21 may send a response message 5 to the first mobile device 11 that includes an assignment to a survivability server associated with providing coverage for the area that includes the current location of the first mobile device 11, such as the first survivability server 41. That area may be due to a physical location of the first mobile device or due to the address of the first mobile device in accordance with the location information included in the initial communication 3. The assignment of the survivability server may not require any user input and may be automatic upon receipt of the initial communication 3 such that the assignment of the first survivability server 41 to the first mobile device 11 is a dynamic and automatic assignment.

One example of an assignment of a survivability sever would be to dynamically assign an appropriate outbound survivable Session Initiation Protocol ("SIP") proxy for a SIP user agent running in the first mobile device 11. The sign-in step to the service could occur via the initial communication 3 via a SIP SUBSCRIBE/NOTIFY exchanged with an XML body containing the configuration data of the mobile device. The SUBSCRIBE message would be the initial communication 3 and the NOTIFY message would be the response communication 5. It should be understood that the assigned SIP proxy would depend upon the SIP user agent current location identified in the current location of the initial communication 3 and a CAC policy defined for this location that defines the SIP proxy for this identified location. The lookup for the CAC policy and assignment of the SIP proxy to the SIP user agent of the first mobile device could be performed by the central session management server 21 and could occur in response to receipt of sign-in information via the initial communication 3.

After the response communication 5 from the central session management server 21 is received by the first mobile device 11, the first mobile device 11 may register itself with the central session management service hosted by the central session management server 21 and also the first survivability server 41 that was assigned to the first mobile device 11 as communicated in the response communication 5. The first mobile device 11 may send a first registration message 7 to the central session management server 21 and a second registration message 9 to the first survivability server to achieve such registration. If SIP protocol is used in the system 1, a SIP REGISTER request may be such registration messages 7 and 9.

Alternatively, the SIP proxy may be used as an outbound proxy by the SIP user agent. In this case, the SIP user agent registers with the SIP proxy and the SIP proxy relays the registration to the central session management server 21.

In the event the first mobile device thereafter attempts a communication to the second or third mobile device 31 or 33, such a communication may be formed via a connection between these devices formed via central session management server 21. Further, in the event service fails due to a failure or other problem experienced by the network or the central session management server 21, the first mobile device 11 may still be enabled to make or receive multi-modal real-time sessions via the first survivability server 41.

In the event the first mobile device changes a location so substantially in distance that it leaves the first area to which the first survivability is assigned, the first mobile device 11 may subsequently be reassigned to another survivability server responsible for providing coverage in an area that includes the new location of the first mobile device, such as the second survivability server 43. The reassignment of the survivability server to the first mobile device 11 may occur via a transparent sign-in refresh procedure that will automatically update the survivability provider address. Such automatic messaging may require the first mobile device to resubmit information provided in the initial communication 3 in a subsequent message 13 to initiate the reassignment of the survivability server by the central session management server 21. Such a reassignment could then be communicated via a reassignment message 15 from the central session management server 21 to the first mobile device 11. The first mobile device 11 could then send a registration message 19 to the second survivability server to register with that server.

Alternatively, the subsequent message 13 could seek to again sign-in to the central session management server 21. The response message 15 may then be similar to response message 5 but assign the second survivability server 43 instead of the first survivability server 41 due to the new current location of the first mobile device 11. The first mobile device 11 may then re-register with the central session management server 21 via registration message 17 and register with the second survivability server via registration message 19. The first mobile device or central session management server 21 may also send a message to the first survivability server 41 to inform the first survivability server 41 that the first mobile device is no longer assigned to the first survivability server 41.

The first mobile device 11 may be configured to determine when it has moved far enough to be in a new location to self actuate the transparent sign-in refresh procedure upon a detection of movement of more than or equal to a predetermine distance from when the initial sign-in procedure was conducted. Alternatively, the central session management server 21 may be configured to periodically monitor the location of the first mobile device 11 by sending messages to the first mobile device 11 at predetermined time intervals to evaluate whether a new sign-in procedure should be actuated for reassigning a survivability server to the first mobile device 11. Upon determining a reassignment is needed, the central session management server 21 may send a message to the first mobile device to initiate the transparent sign-in refresh procedure.

Figure 3:
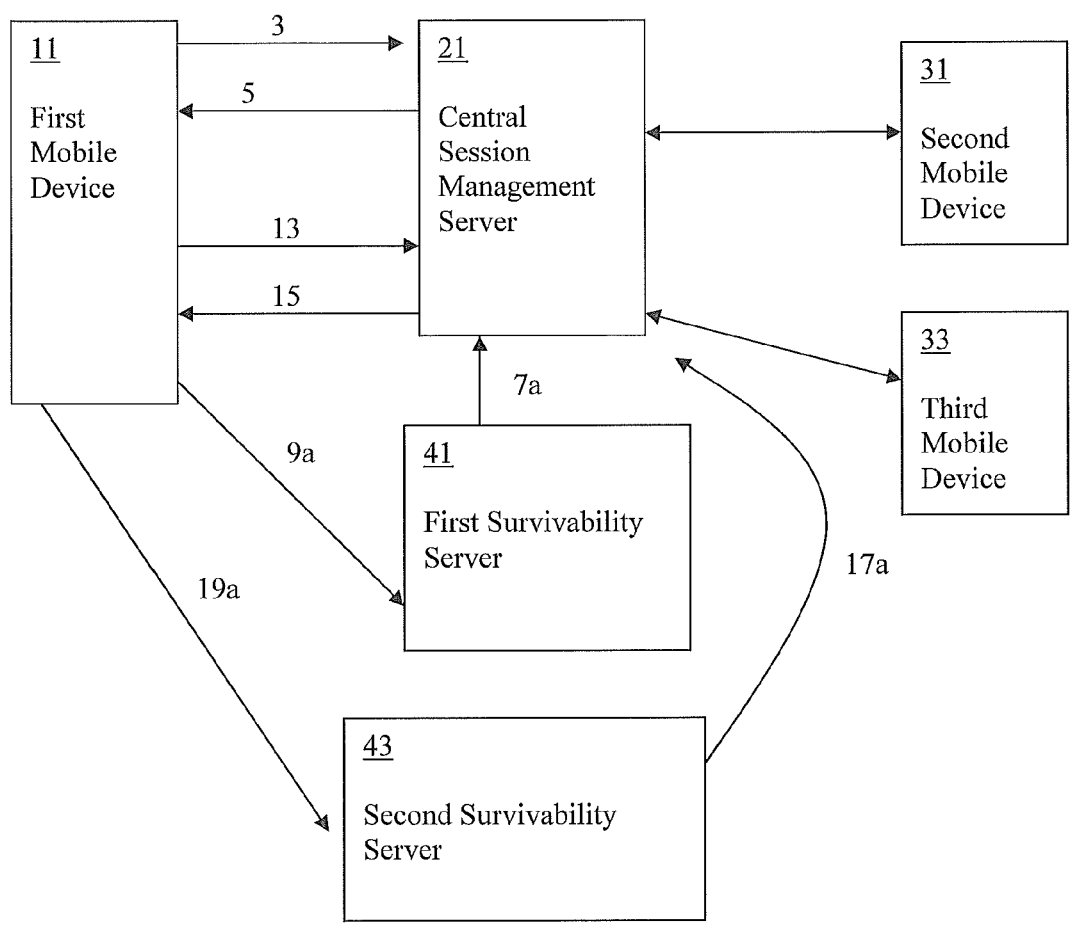
FIG. 3 is a block diagram of a second exemplary embodiment of a communication system.

As shown in FIG. 3, the first mobile device 11 may alternatively be configured to register with the central session management in an alternative messaging arrangement. Instead of sending a registration message directly to the central session management server 21 via a communication 7, the first mobile device may instead send a registration message 9a only to the first survivability server assigned to the first mobile device via response message 5 such that the registration message 9a is forwarded to the central session management server 21 by the first survivability server 41 via registration communication 7a. In this way, the first survivability server 41 may support multi-modal real time sessions in case of loss of communication to the central session management service hosted by the central session management server 21. In some embodiments, the first survivability server 41 may serve as an outbound SIP proxy.

In the event the first mobile device moves to a location positioned out of the coverage area of the first survivability server 41, the first mobile device may execute a transparent sign-in refresh procedure that automatically updates the survivability server address to reassign the first mobile device 11 to the second survivability server 43 responsive for providing coverage in the new location. Such a refresh procedure may utilize communications 13 and 15 as discussed above, for example. However, the updated registration of the first mobile device 11 may then occur via sending a registration message 19a to the second survivability server 43 for forwarding as a registration message 17a to the central session management server 21 as an alternative to the sending of registration messages 17 and 19 discussed above with reference to the system of FIG. 1.

Figure 4:
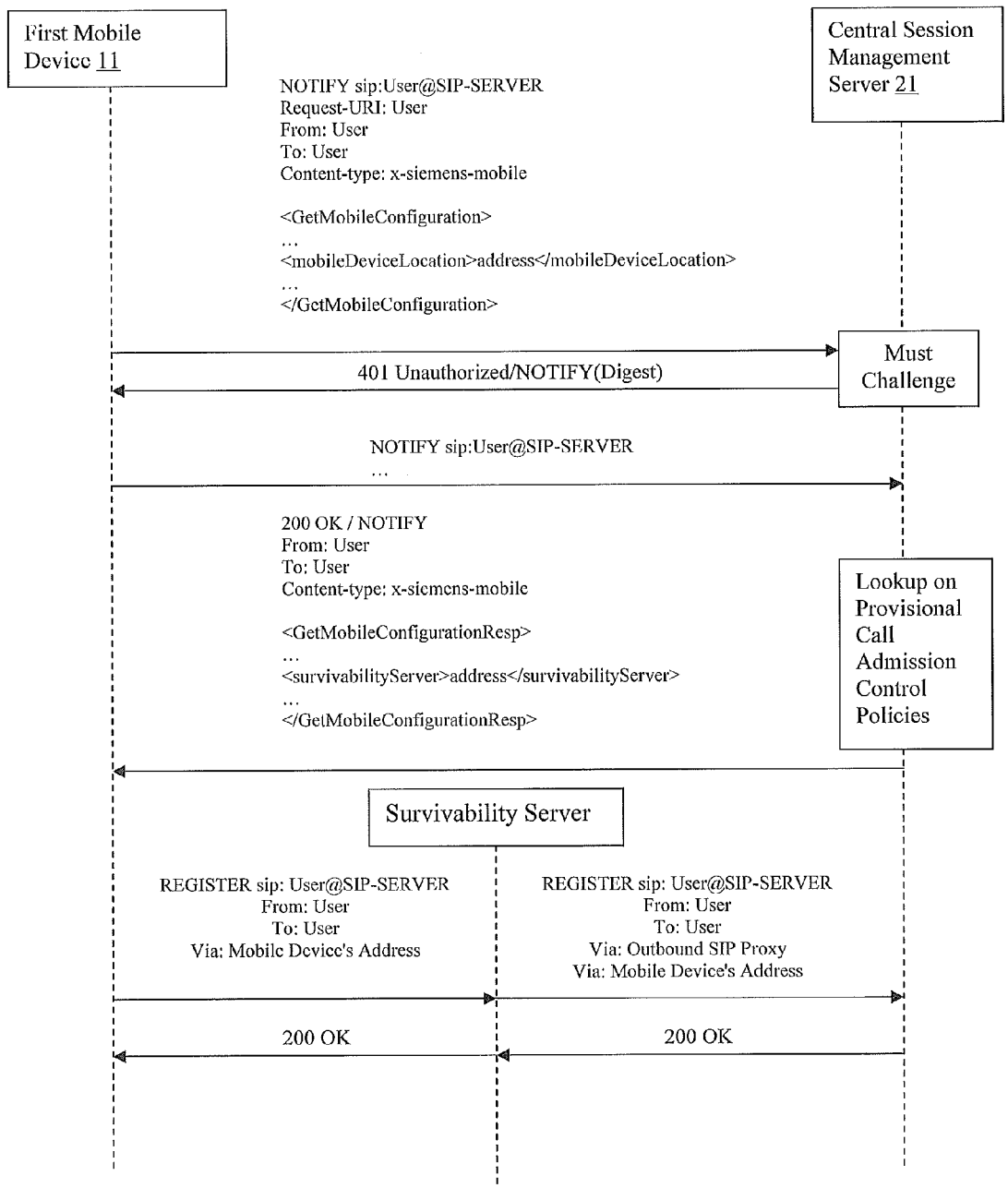
FIG. 4 is a schematic view of signaling that may be exchanged between a mobile device, survivability server, and a server hosting a central session management service that may be utilized in embodiments of the communication system.

An example of SIP signaling to perform a dynamic assignment of survivability service assignment at user sign-in is illustrated in FIG. 4. It should be appreciated that such SIP signaling may be provided in the systems shown and discussed above with reference to FIGS. 1 and 3. The signaling steps include a client application of the first mobile device initiating the sign in process with an authenticated SUBSCRIBE/NOTIFY (or local blind NOTIFY as shown) handshake. The configuration data may be sent from the central session management service hosted by the central session management server 21 to the client of the first mobile device in a XML body. The XML data could be sent in the body of a NOTIFY message sent from the central session management server 21 to the first mobile device, for example.

In the second step of signaling, the central session management server 21 performs a lookup of the first mobile device's address on the provisioned CAC policies and finds the corresponding Survivable Outbound SIP Proxy or other survivability server assigned to the device's current location. The central session management server 21 then sends the mobile configuration data that includes an identification of the survivability server assigned to the first mobile device to the first mobile device in a response message. Such an identification may include an address of the survivability server assigned to the mobile device. The configuration data may be formatted as XML data and may be provided to the first mobile device via the central session management server 21.

Thereafter, the first mobile device 11 sends a SIP REGISTER request to the central SIP server 21 via the dynamically assigned survivability server to ensure continuity of multi-modal real-time sessions even in case there is loss of communication between the survivability server and the central session management server 21 (e.g. network outage, wide area network ("WAN") outage, etc.). Upon such a loss of communication, the survivability server may then provide service to the mobile device to provide the service previously made available by the central session management server.

Embodiments of the system and communication device may utilize a simple sign-in procedure to sign the user into a service via use of the user's communication device to provide an automatic and opaque assignment of survivability services. The dynamic opaque assignment of survivability service to the user's device can be based on the device's current location in terms of either coordinates identifying a physical geographic location or an address of the device (e.g. IP address). Centrally provisioned CAC policies and a centrally provisioned relation between the CAC policies and survivability service providers may be utilized to further streamline operations of certain embodiments of the system and device as well. It should therefore be understood that embodiments of the communication device and system disclosed herein may be configured so that automatic assignment of survivability service may occur by utilizing provisioned CAC policies without requiring a user of a mobile communication device to know anything about network topology or details related to the survivability services for the current location of the user and that user's communication device.

While certain present preferred embodiments of communication devices, systems, and apparatuses for assigning mobile communication devices to a survivability service and methods of making and using the same have been shown and described above, it is to be distinctly understood that the invention is not limited thereto but may be otherwise variously embodied and practiced within the scope of the following claims.

What is claimed is:

1. A communication system comprising:
a central session management server having at least one non-transitory memory and at least one processor;
a first communication device having at least one non-transitory memory and at least one processor; and
a first survivability server having at least one non-transitory memory and at least one processor;
the first communication device sending an initial message to the central session management server to be authenticated by the central session management server, the initial message comprising account information for a user associated with the first communication device and current location information of the first communication device;
the central session management server authenticating the first communication device by evaluating the account information and assigning the first survivability server to the first communication device based on the current location information provided in the initial message;
the central session management server sending a response message to the first communication device in response to the initial message, the response message comprising information to effect an assignment of the first survivability server to the first communication device; and
the first communication device sending at least one registration message to at least one of the central session management server and the first survivability server to register with at least one of the central session management server and the first survivability server such that communications utilizing a service hosted by the central session management server is usable by the first communication device via the first survivability server if the central session management server is unable to provide the service; and
a second survivability server, the first survivability server being responsible for providing survivability service in a first area and the second survivability server being responsible for providing survivability service in a second area, the first area being comprised of a location identified by the current location information of the initial message and wherein the first communication device is a mobile communication device; and
the first communication device being reassigned to the second survivability server by the central session management server after the first communication device is moved such that the first communication device is positioned in a location within the second area.

2. The system of claim 1 wherein the first communication device is reassigned to the second survivability server by the first communication device sending a message to the central session management server to initiate reassignment, the message sent to initiate reassignment comprises new current location information of the first communication device;
the central session management server evaluates the new current location information and assigns the second survivability server to the first communication device and sends a reassignment message to the first communication device identifying the second survivability server to effectuate reassignment.

3. The system of claim 2 wherein the first communication device determines when the first communication device moved into the second area.

4. The system of claim 2 wherein the central session management server determines when the first communication device is moved into the second area and sends a message to the first communication device prompt the first communication device to send the message to the central session management server to initiate reassignment.

5. The system of claim 1 wherein the at least one registration message is a SIP REGISTER request.

6. The system of claim 1 wherein the at least one registration message is a registration message sent to the first survivability server, and wherein the first survivability server sends a message to the central session management server after receiving the registration message from the first communication device to inform the central session management server of the first communication device registering with the first survivability server.

7. The system of claim 1 wherein the first communication device is a mobile phone, a laptop, a tablet, or a mobile communication terminal and wherein the current location information is one of an IP address of the first communication device, a MAC address of the first communication device, an NW address of the first communication device, a civic address of the first communication device, a Location Identification Number of the first communication device, an address of the first communication device, and coordinate information identifying a geographic location of the first communication device.

8. The system of claim 1 wherein the central session management server utilizes call admission control policies to evaluate the account information and assigning the first survivability server to the first communication device based on the current location information provided in the initial message and wherein the first survivability server is an SIP Proxy.

9. A method for assigning a survivability service to a communication device comprising:
   a first communication device sending an initial message to a central session management server to be authenticated by the central session management service, the initial message comprising account information for a user associated with the first communication device and current location information of the first communication device;
   the central session management server authenticating the first communication device by evaluating the account information and assigning a first survivability server to the first communication device based on the current location information provided in the initial message;
   the central session management server sending a response message to the first communication device in response to the initial message, the response message comprising information to effect an assignment of the first survivability server to the first communication device:
   the first communication device sending at least one registration message to at least one of the central session management server and the first survivability server to register with at least one of the central session management server and the first survivability server such that communications utilizing a service hosted by the central session management server is usable by the first communication device via the first survivability server if the central session management server is unable to provide the service;
   wherein the first survivability server being responsible for providing survivability service in a first area, the first area being comprised of a current location identified in the current location information of the initial message and wherein the first communication device is a mobile communication device; and
   the first communication device being reassigned to a second survivability server by the central session management server after the first communication device moves into a second area, the second survivability server being responsible for providing survivability service in the second area.

10. The method of claim 9 wherein the first communication device is reassigned to the second survivability server by the first communication device sending a message to the central session management server to initiate reassignment, the message sent to initiate reassignment comprises new current location information of the first communication device;
   the central session management server evaluates the new current location information and assigns the second survivability server to the first communication device and sends a reassignment message to the first communication device identifying the second survivability server to effectuate reassignment.

11. The method of claim 10 wherein the first communication device determines when the first communication device moved into the second area.

12. The method of claim 10 wherein the central session management server determines when the first communication device moved into the second area and sends a message to the first communication device to prompt the first communication device to send the message to the central session management server to initiate reassignment.

13. The method of claim 9 wherein the at least one registration message is a registration message sent to only the first survivability server, and wherein the first survivability server sends a message to the central session management server after receiving the registration message from the first communication device to inform the central session management server of the first communication device registering with the first survivability server.

14. A terminal communication device comprising:
   non-transitory memory; and
   at least one processor, the at least one processor communicatively coupled to the memory;
   the memory having a client application stored thereon that is executed by the at least one processor, such that a method is performed by the communication device, the method comprising:
      the communication device sending an initial message to a central session management server to be authenticated by the central session management server, the initial message comprising account information for a user associated with the communication device and current location information of the communication device;
      the communication device receiving a response message from the central session management server that is in response to the initial message, the response message comprising information to effect an assignment of a first survivability server to the communication device; and
      the communication device sending at least one registration message to at least one of the central session management server and the first survivability server to register with the at least one of the central session management server and the first survivability server such that communications utilizing a service hosted by the central session management server is usable by the communication device via the first survivability server if the central session management server is unable to provide the service; and
      wherein the first survivability server is responsible for providing survivability service in a first area, the first area being comprised of the current location identified in the current location information of the initial message; and
   the communication device being reassigned to a second survivability server by the central session management server after the communication device moves into a second area, the second survivability server being responsible for providing survivability service in the second area.

15. The terminal communication device of claim 14 wherein the communication device is reassigned to the second survivability server by the communication device sending a message to the central session management server to initiate reassignment, the message sent to initiate reassignment comprising new current location information of the first communication device; and the communication device receiving a reassignment message from the central session management server that identifies the second survivability server to effectuate reassignment of the communication device to the second survivability server.

16. The terminal communication device of claim 15 wherein the method further comprises the communication device determining when the first communication device moved into the second area.

* * * * *